Patented Nov. 26, 1935

2,022,471

UNITED STATES PATENT OFFICE 2,022,471

PECTOUS MATERIAL AND PROCESS OF MAKING THE SAME

Herbert T. Leo, Clarence C. Taylor, and Frederick A. Beck, Anaheim, Calif.

No Drawing. Application October 16, 1933, Serial No. 693,893

10 Claims. (Cl. 99—11)

This invention relates to a process for making pectous material and to the product thereby produced. More particularly, the invention relates to the preparation of a dry, standardized mixture of finely divided fibrous material containing either pectose in substantially its original state or soluble pectin, and a filter aid, such as diatomaceous earth.

Heretofore pectin has been obtained from citrus fruits and apples by extracting the fruit pulp with an aqueous acid solution to effect hydrolysis of the pectose. After hydrolysis, the digested fruit pulp has been subjected to filtration and the pectin content of the filtrate has been precipitated with either aluminum hydroxide or with alcohol, and subsequently purified.

These steps in which the pectin has all been separated from the pulp and purified have been necessary in order to avoid contaminating the final product with undesirable flavors and particularly to make possible the preparation of a properly standardized material. This is because the standardization of pure pectin is a relatively easy matter while, prior to our invention it has not been possible to standardize pulp or cellulose products containing pectin, such as the one disclosed herein. One of the reasons why such products have never been practical in the past is on account of the lack of proper standardization.

According to our present process, the water soluble ingredients of fruit pulp are removed by washing with water and pressing the washed mass with the help of a filter aid under considerable pressure. The product so produced which comprises a mixture of fibrous vegetable or fruit pulp containing substantially its original pectose content is then treated with an acid solution to hydrolyze the pectose to pectin. The resulting solution is then cooled, partially neutralized, and the pectin together with the pulp is precipitated with alcohol or by other suitable means and dried. The product is then standardized by the addition of some suitable inert material, but for reasons hereinafter to be considered, diatomaceous earth is highly to be preferred for this purpose.

It is therefore, an object of this invention to provide a relatively economical and simple method for the preparation of a dry, standardized, pectin product containing fibrous material with a pectous substance distributed therein, and a filter aid to assist in the subsequent extraction of the available pectin content upon acid digestion of the mixture.

It is a further important object of this invention to provide a dry, standardized pectous material having a pectin content which is stable for purposes of shipment or storage but which is readily available in soluble form when required for use.

It is a further important object of this invention to provide a mixture of fibrous and pectous material and a filter aid to assist in the subsequent extraction of the pectin from the inert material.

Other and further important objects of his invention will become apparent from the following description and appended claims.

Various pectose bearing fruit and vegetable materials may be used as the starting point for making our product. Oranges, lemons, limes and grapefruits all contain large quantities of pectose, the mother substance that yields pectin upon hydrolysis. In addition to these citrus fruits, our invention also includes the use of apples, or apple pomace, or vegetables rich in pectose as a source of pectin.

According to our present process, the citrus fruit or apple pomace is pressed to remove the natural juices and oils. The mass is then reduced to granular form, say to pass through about .10 inch mesh screen and washed with water to remove a further quantity of oils and juices. The washing should be done rapidly and at as low a temperature as is readily available to inhibit enzymic and fermentative actions. Of course, it will be understood that other suitable washing and grinding steps may be employed if desired.

The comminuted material is drained free from excess water and acid is added to bring the pH of the mixture, after thirty minutes cooking at 212 degrees F. to between 2.40 and 2.65. Cooking at a pH below 2.40 will hydrolyze the pectose satisfactorily giving water soluble pectin, but at the same time producing a very large amount of pectic acid at the expense of the pectin content, a reaction which is to be eliminated as far as possible. The extraction is too slow to be practical at a pH above 2.65. We prefer to use hydrochloric acid for the hydrolyzing agent but other acids such as nitric acid or sulphuric acid may also be employed.

Immediately following this hydrolysis, the pH value of the solution is increased to about 3.25. We prefer to accomplish this by adding a solution of some suitable buffer salt such as sodium acetate or sodium citrate. The addition of strong alkalies for this purpose is not desirable since any concentration of alkalies in the solution, even for a few seconds will tend to destroy the soluble pectin formed. However, an alkali as strong as sodium bicarbonate may be used if the mass is kept very cool and the alkali is added during constant stirring.

The whole mass is then precipitated by any well known method, preferably by adding approximately an equal volume of alcohol, since this precipitating agent requires a minimum number of steps to produce the end product. The precipitate which consists principally of fibrous matter and precipitated pectin, is then dried in any convenient apparatus and ground to a degree satisfactory for obtaining ready solution of the pectin during its subsequent use. However, the grinding must not be so fine as to produce particles of colloidal size since when this occurs the soluble pectin cannot be removed from the pulp by filtration.

The product is then standardized by the addition of a suitable amount of an inert material such as diatomaceous earth. One of the reasons why diatomaceous earth is to be preferred is that it acts as a filter aid. In fact, the presence of such a filter aid in the material is necessary during the subsequent extraction of the pectin from the pulp by the consumer, and it is therefore advantageous that it be added during standardization.

Standardization of the finished product is an important feature of our invention. Methods of standardizing pure pectin have long been known but the difficulties involved in the standardization of pulp products containing pectin have prevented their use commercially. The standardization of our pectin material is made possible by the accurate control of each of the following factors in the standardization process:

1. The pH of the mass during the extraction of the pectin content.
2. Time of boil.
3. Size of fibrous cellulose particles.
4. Quantity of diatomaceous earth present in the mixture.
5. Proportion of pectous bearing materials and sugar.
6. Percent of extraction of pectin.

An illustration of a suitable method of standardization of my products together with suitable conditions in accord with the requirements given above is as follows:

30 grams of the dry fibrous pectous material are mixed with 1000 cc. of water containing just enough fruit acid to overcome the natural alkalinity of the water. This mixture should be boiled for ten minutes to cause the complete solution of the pectin. The solution is then drained away from the fibers, pressing the fibers to obtain practically all of the solution. A jelly is next made using 350 cc. of this extract and 500 grams of sugar and boiling to a total weight of 770 grams. The hot syrup is then poured into a glass containing 4 cc. of 50% citric acid solution. After twelve hours, a firm jelly should be formed. If not sufficiently firm, more of the extract should be used with 500 grams of sugar and boiled to 770 grams total weight until the minimum quantity which will produce a firm jell has been found. The grade of the pectin product is then calculated in accord with the following formula:

$$\frac{\text{CC of concentrate in jelly}}{\text{CC of total extract}} = \frac{500}{X}$$

$$\frac{X}{(\text{grams of material taken})} = \text{Grade of the pulp material.}$$

When obtained in this manner, the grade represents the number of parts of sugar that can be made into a firm jelly of 65% sugar content, using pectin from one part by weight of the pectous material being tested.

After obtaining this figure representing the grade, the pectous material is standardized by incorporating with it a sufficient amount of some inert material, preferably diatomaceous earth or other filter aid to bring the grade down to a predetermined standard to which all of the pectin marketed may be made to conform.

The following procedure represents a further modification of our invention in which no heat is used during the hydrolysis of the pectose. The juice is first extracted from the pulp by the method described above or any other suitable method. The pulp should preferably be reduced to pass through a .10 inch mesh screen as in the previous examples, further grinding being undesirable since too many of the fine particles would be lost during filtration.

Enough sulphuric acid is added to the drained pulp to bring its pH value to about 1.25. This mixture is allowed to stand at room temperature for about two hours during which time hydrolysis of the pectose to pectin takes place. At the end of this period, sufficient alcohol is added with constant stirring to make the mixture about 50% alcohol by volume. This shrinks and precipitates the pectin and pulp.

The acid may now be neutralized by any suitable alkaline material such as sodium carbonate. We prefer to employ an alkali which will produce a soluble reaction product so that it may be readily removed from the precipitate by washing. When sodium carbonate is used, the reaction product, sodium sulphate is soluble in the 50% alcohol mother liquor and most of it remains in said liquor. It will be understood that while we have found sulphuric acid to be particularly adapted for use in this modification of our process, other acids such as hydrochloric or nitric are also satisfactory. The product is next standardized in accord with the procedure disclosed above. In general, any acid capable of producing the required pH value in the solution will be operative in this or the other modifications of our process.

Another advantage of this procedure is that it permits neutralization of the acid with alkali without seriously damaging the pectin. We attribute this to the fact that the pectin is already out of solution at the time the alkali is added.

When this material is used by the consumer, it must first be treated with hot water in the same manner as sample used in the standardization test described above to remove the pectin. It must then be filtered, preferably in a press such as is disclosed in the Herbert T. Leo application Serial No. 669,114, filed May 3, 1933.

The acidity of the water and the time of boiling may vary considerably but it is preferable that they correspond with the same factors in the standardization test described above.

A distinct advantage of this product over other citrus pectin materials is that a liquid pectin concentrate can be made from it which contains substantially no pectic acid. This is due to the fact that the pectic acid is precipitated by the alcohol, and being an irreversible colloid, does not redissolve when the pectin is dissolved. Many pectin preparations have the disadvantage that they contain substantial amounts of pectic acid in solution.

It is also possible to prepare a fibrous product, the pectin content of which is in the form of pectose, an insoluble pectin material. When this is done, it is necessary for the consumer to hydrolyze the pectin before use in order to make it soluble. When this form of our invention is to be utilized, the citrus fruit or apple pomace, or other source of pectose, is pressed to remove the juices and also the oils. The mass is then ground very fine and washed repeatedly with water at the usual tap temperature in any convenient apparatus. This washing process should be done rapidly and at as low temperatures as are readily available, in order to avoid fermentation due to enzymic action.

The diatomaceous earth is then added in sufficient quantity to assist in the filtration and pressing of the pulp mass to remove as much as possible of the liquid content. By diatomaceous earth is meant any of the various forms of infusorial earth, kieselguhr, and the like that are commonly used as filter aids and sold under various trade marks, such as "Hypocel".

The amount of diatomaceous earth used may vary from one pound to ten pounds for each ten gallons of drained, water washed fruit pulp. The variation in the quantity of diatomaceous earth takes place on account of the texture and condition of the fruit. When slimy and hard to press, more diatomaceous earth is necessary.

Inasmuch as alkaline conditions are harmful to pectous materials, it may be necessary at this stage to add a slight acidity to the peel, or fruit pulp. We have also found that enzymes destroy and digest citrus peels very readily, so that to prevent this, it is desirable but not absolutely necessary, to add sulphurous acid, either added as such or formed by the action of sulphur dioxide on the water present in the mass. When a long period of time elapses between pressing and drying, it is impossible to prevent enzymic action without taking some such positive step as this.

The wet pulpy mass with the earth material admixed therewith is now run into a press and pressed out thoroughly. Great pressure may be exerted with the earth material present and a larger proportion of liquid content may therefore be extracted. We prefer to use the type of press and filter described in the Herbert T. Leo application Serial No. 669,114, filed May 3, 1933.

The pressed cake is then disintegrated and quickly dried at a temperature sufficiently low to prevent complete dehydration of the cellulose tissues. It is preferable to leave a few percent, say 3 or 4% of moisture in the dried pulpy mass, since otherwise it is extremely difficult to wet the fibrous material in the subsequent digestion treatment. Any efficient and convenient drier may be employed but we prefer to use a rotary drier with heated air and to use a steam jacketed or otherwise heated shell.

The dried material contains varying amounts of diatomaceous earth and also, depending upon the raw material used, varying proportions of pectose. In order to establish the pectin value of the product, and standardize it for jelly strength, we use the following method:

For instance, 30 grams of the dry fibrous material is admixed with 1000 cc. water, the mass brought to a boil and an acid, preferably hydrochloric, added. The added hydrochloric acid together with any fruit acid present or added thereto, should be sufficient to bring the pH value within the relatively narrow range of 2.40 to 2.65. A lower pH value is conductive of producing too much pectic acid and a pH above 2.65 will not extract pectin efficiently.

The acidified mass is heated for half an hour at boiling temperature or thereabouts and then pressed out in a small fruit bag press. Since the hot pectin liquor is too strongly acid for jelly making, the acidity is partially neutralized by the addition of about 6 cc. of sodium acetate solution containing 1 gram of sodium acetate to each 4 cc. of solution, based upon 1000 cc. of extract.

350 cc. of the partially neutralized extracts are then measured out and 500 grams of sugar are added thereto. From this point the test is continued in precisely the manner described above for standardizing pectin containing pulp in which the pectose content has been hydrolyzed before testing.

In order to standardize this product to some predetermined strength, either pectose material of prior and known strength is mixed therewith or some inert material like diatomaceous earth or a sugar, such as cerelose or corn sugar is added. It is also possible to standardize the peel by sifting out a portion of the diatomaceous earth previously added for filtering purposes, thereby raising the pectin content to some predetermined standard.

The diatomaceous earth performs another function in my invention besides acting as filter aid and as a standardizing medium. It absorbs the bitter flavoring material and oils from the pulp so that these substances do not remain to contaminate the finished pectin material.

We are aware that many changes may be made and numerous details may be varied through a wide range without departing from the principles of this invention, and we therefore, do not purpose limiting the patent granted hereon otherwise than necessitated by the prior art.

We claim as our invention:

1. A pectous product derived from a fruit or vegetable containing pectose, comprising dry, finely divided fibrous cellulose tissue larger than colloidal size containing substantially the original content of pectous material hydrolized to soluble pectin and substantially free from objectionable water soluble flavoring material and bitter components of the original vegetable or fruit, and a filter aid in finely divided form admixed therewith.

2. A dry, standardized pectous material of definite available jelly strength comprising a mixture of comminuted fibrous material of greater than colloidal size, pectin and diatomaceous earth.

3. A dry, standardized pectous material comprising diatomaceous earth, pectin, and granulated citrus fruit peel, said product being free from objectionable bitterness.

4. A dry pectous material comprising cellulose particles of greater than colloidal size, and soluble pectin, said material being standardized to a predetermined pectin content by the incorporation of a filter aid.

5. A dry pectous material comprising cellulosic particles of greater than colloidal size, soluble pectin and diatomaceous earth, said diatomaceous earth being in such proportion as to bring the available pectin content of said material to a predetermined standard.

6. The process of preparing a pectous material, which comprises comminuting fruit or vegetable pulp containing pectose to a size greater than colloidal size, washing the comminuted pulp with water to remove water soluble constituents thereof, hydrolyzing the pectose content of said pulp to pectin with an acid, partially neutralizing said acid, precipitating the pectin and pulp, grinding to a finer size but still greater than colloidal size and straining the precipitated mass, and standardizing said mass by adding a suitable amount of diatomaceous earth thereto.

7. The process of preparing pectous material of standardized jelly strength, which comprises washing finely comminuted citrus fruit peel of greater than colloidal size with water, adding thereto an acidified solution having a pH value of from 2.40 to 2.65, boiling the acidified mass to hydrolyze the pectous content thereof into pectin, increasing the pH value of the solution to 3.25, precipitating the mass with alcohol, drying, grinding to a size greater than colloidal size, adding diatomaceous earth, and standardizing said mass.

8. The process of preparing a pectous material of standardized jelly strength, which comprises washing finely granulated pectin bearing vegetable material with water, adding an acidified solution thereto to give the resulting mixture a pH value of from 2.40 to 2.65, heating said mixture to hydrolyze the pectose content into pectin, increasing the pH value of the solution to 3.25, precipitating the mass with alcohol, drying, grinding to a size greater than colloidal size, and adding a sufficient quantity of a filter aid to reduce the jellying strength of said material to a predetermined standard.

9. The process of preparing pectous material of standard jelly strength, which comprises washing granulated pectin bearing vegetable material with water, draining off excess liquid therefrom, adding sufficient acid to bring the pH value to 1.25, allowing said solution to stand until hydrolysis of the pectose to pectin has been effected, precipitating the mass with alcohol and afterward neutralizing, washing and drying the precipitated mass and adding a sufficient quantity of diatomaceous earth to standardize said mass.

10. The process of preparing pectous material of standard jelly strength, which comprises washing granulated pectin bearing vegetable material with water, and draining off excess liquid, adding sufficient acid to bring the pH value to about 1.25, allowing said solution to stand until hydrolysis of the pectose to pectin has been effected, precipitating the mass with alcohol, neutralizing, washing and drying the precipitated mass, and mixing a sufficient quantity of filter aid with said mass to bring its available pectin content to a predetermined standard.

HERBERT T. LEO.
FREDERICK A. BECK.
CLARENCE C. TAYLOR.